United States Patent
Peeters et al.

(10) Patent No.: US 11,031,804 B2
(45) Date of Patent: Jun. 8, 2021

(54) POWER CONTROLLER

(71) Applicant: NXP B.V., Eindhoven (NL)

(72) Inventors: Jacobus Eduardus Henricus Maria Peeters, Best (NL); Peter Theodorus Johannes Degen, Arnhem (NL)

(73) Assignee: NXP B.V., Eindhoven (NL)

( * ) Notice: Subject to any disclaimer, the term of this patent is extended or adjusted under 35 U.S.C. 154(b) by 130 days.

(21) Appl. No.: 15/804,993

(22) Filed: Nov. 6, 2017

(65) Prior Publication Data

US 2019/0140473 A1    May 9, 2019

(51) Int. Cl.
  *G05B 23/02*    (2006.01)
  *G05B 15/02*    (2006.01)
  *H02J 7/02*     (2016.01)

(52) U.S. Cl.
  CPC .............. *H02J 7/027* (2013.01); *G05B 15/02* (2013.01); *G05B 23/0291* (2013.01); *G05B 23/0294* (2013.01)

(58) Field of Classification Search
  CPC ..... G06F 1/30; G06F 1/26; G06F 1/28; G06F 11/0757; G06F 11/0754; G06F 11/1441; G06F 1/24; G06F 11/0793; G06F 11/1438; H02H 11/006; H02H 3/16
  See application file for complete search history.

(56) References Cited

U.S. PATENT DOCUMENTS

| | | | | |
|---|---|---|---|---|
| 4,891,743 A | * | 1/1990 | May .................... | G01R 31/40 363/87 |
| 4,951,171 A | * | 8/1990 | Tran .................... | G06F 1/30 340/660 |
| 5,151,855 A | * | 9/1992 | Gray .................... | G06F 1/30 713/330 |
| 5,224,010 A | * | 6/1993 | Tran .................... | G06F 1/28 361/90 |
| 5,317,752 A | * | 5/1994 | Jewett .................. | G06F 1/12 714/14 |
| 5,528,446 A | * | 6/1996 | Sankaran ............ | G01R 31/006 361/103 |
| 5,581,692 A | * | 12/1996 | Nevitt .................. | G06F 1/26 713/323 |
| 5,790,878 A | * | 8/1998 | Anderson ........... | G06F 11/0754 348/372 |

(Continued)

OTHER PUBLICATIONS

NXP; "TEA18363LT—GreenChip SMPS control IC—Rev. 2"; Product data sheet; 27 pages (Dec. 12, 2013).

(Continued)

*Primary Examiner* — Darrin D Dunn

(57) ABSTRACT

One example discloses a power controller for a power device, wherein the power device includes a normal state, the power controller having: an input configured to receive fault detection signals attributable to the power device; an output configured to be coupled to the power device; and wherein the power controller is configured to send a state change signal over the output to change the normal state of the power device to a first fault state for a first time period in response to a first fault detection signal; and wherein the power controller is configured to send a state change signal over the output to change the first fault state of the power device to a second fault state for a second time period in response to a second fault detection signal.

20 Claims, 6 Drawing Sheets

(56) References Cited

U.S. PATENT DOCUMENTS

| | | | | |
|---|---|---|---|---|
| 5,872,983 A * | 2/1999 | Walsh | G06F 1/1632 | 710/100 |
| 5,977,750 A * | 11/1999 | Ng | G01R 19/16542 | 320/132 |
| 6,301,133 B1 * | 10/2001 | Cuadra | H02J 1/102 | 363/65 |
| 6,366,208 B1 * | 4/2002 | Hopkins | H05B 41/2851 | 340/650 |
| 6,445,163 B1 * | 9/2002 | Chenier | H02J 3/14 | 320/130 |
| 6,449,725 B2 * | 9/2002 | Deenadhayalan | G06F 1/3221 | 713/324 |
| 6,687,217 B1 * | 2/2004 | Chow | H04B 1/3805 | 370/217 |
| 7,170,194 B2 * | 1/2007 | Korcharz | H02J 1/10 | 307/21 |
| 7,308,614 B2 * | 12/2007 | Kojori | G05B 23/0289 | 701/33.8 |
| 7,334,158 B2 * | 2/2008 | Bibikar | G06F 1/30 | 714/14 |
| 7,506,209 B2 * | 3/2009 | Kawata | G06F 11/1417 | 714/23 |
| 7,577,542 B2 * | 8/2009 | Vacar | H04Q 9/00 | 702/124 |
| 7,583,487 B2 * | 9/2009 | Chapuis | G06F 1/26 | 361/62 |
| 7,844,840 B2 * | 11/2010 | McShane | G06F 1/32 | 323/266 |
| 8,654,484 B2 * | 2/2014 | Konecny | H02H 3/20 | 361/18 |
| 8,755,165 B2 * | 6/2014 | Hansen | H01J 37/24 | 361/235 |
| 8,970,134 B2 * | 3/2015 | Breuer | H05B 33/0893 | 315/308 |
| 9,020,704 B2 * | 4/2015 | Kanekawa | B62D 5/0481 | 701/43 |
| 9,354,695 B2 * | 5/2016 | Araki | G06F 1/3296 | |
| 9,478,292 B2 * | 10/2016 | Sun | G11C 16/10 | |
| 9,778,988 B2 * | 10/2017 | Huang | G06F 11/1417 | |
| 9,869,727 B2 * | 1/2018 | Schweigert | G06F 1/28 | |
| 10,013,042 B1 * | 7/2018 | Abhishek | G06F 1/3275 | |
| 10,020,676 B2 * | 7/2018 | Wang | H02J 9/061 | |
| 2003/0204777 A1 * | 10/2003 | Kojori | G05B 23/0289 | 714/14 |
| 2004/0036359 A1 * | 2/2004 | Griffith | H02J 1/102 | 307/43 |
| 2004/0184208 A1 * | 9/2004 | Liu | H02H 3/207 | 361/90 |
| 2004/0201931 A1 * | 10/2004 | Korcharz | H02J 1/10 | 361/18 |
| 2005/0046440 A1 * | 3/2005 | Phillips | H02J 9/06 | 307/80 |
| 2006/0179353 A1 * | 8/2006 | Kawata | G06F 11/1417 | 714/39 |
| 2007/0279068 A1 * | 12/2007 | Harres | H02H 1/0015 | 324/522 |
| 2008/0244296 A1 * | 10/2008 | Kangas | G06F 1/30 | 713/330 |
| 2008/0304187 A1 * | 12/2008 | Balakrishnan | F16D 31/02 | 361/18 |
| 2009/0009183 A1 * | 1/2009 | Mousavi | G01R 31/3648 | 324/537 |
| 2009/0132061 A1 * | 5/2009 | Stubbs | A61N 1/3706 | 700/8 |
| 2009/0167089 A1 * | 7/2009 | Dishman | H02J 1/10 | 307/64 |
| 2009/0231888 A1 * | 9/2009 | Baurle | H02M 1/32 | 363/21.12 |
| 2009/0251931 A1 * | 10/2009 | Baurle | H02M 1/32 | 363/21.12 |
| 2010/0277838 A1 * | 11/2010 | Balakrishnan | F16D 31/02 | 361/18 |
| 2011/0188274 A1 * | 8/2011 | Balakrishnan | F16D 31/02 | 363/49 |
| 2011/0205769 A1 * | 8/2011 | Blackwell | H02J 1/10 | 363/65 |
| 2011/0224928 A1 * | 9/2011 | Lin | G01R 31/367 | 702/63 |
| 2011/0234255 A1 * | 9/2011 | Chobot | G01R 31/40 | 324/764.01 |
| 2011/0264952 A1 * | 10/2011 | Heinrichs | G06F 1/30 | 714/14 |
| 2012/0033338 A1 * | 2/2012 | Van Leeuwen | H02H 3/38 | 361/62 |
| 2012/0038322 A1 * | 2/2012 | Moorhead | H02J 7/0029 | 320/136 |
| 2012/0063037 A1 * | 3/2012 | Konecny | H02H 3/027 | 361/18 |
| 2012/0072754 A1 * | 3/2012 | Doblar | G06F 11/3051 | 713/340 |
| 2012/0091815 A1 * | 4/2012 | Richards, III | G06F 1/189 | 307/80 |
| 2012/0091914 A1 * | 4/2012 | Hansen | H01J 37/24 | 315/307 |
| 2012/0091975 A1 * | 4/2012 | Trojer | H02H 3/16 | 323/234 |
| 2012/0206842 A1 * | 8/2012 | Balakrishnan | F16D 31/02 | 361/18 |
| 2012/0212058 A1 * | 8/2012 | Buterbaugh | H02J 1/10 | 307/53 |
| 2012/0299578 A1 * | 11/2012 | Korrek | H03M 1/207 | 324/76.15 |
| 2013/0339769 A1 * | 12/2013 | Waters | G06F 1/266 | 713/310 |
| 2014/0001871 A1 * | 1/2014 | Vogman | H02M 1/32 | 307/82 |
| 2014/0035375 A1 * | 2/2014 | Vogman | G06F 1/263 | 307/64 |
| 2014/0229074 A1 * | 8/2014 | Kanekawa | B62D 5/0481 | 701/43 |
| 2014/0252955 A1 * | 9/2014 | Gunda | H05B 33/0803 | 315/119 |
| 2014/0358473 A1 * | 12/2014 | Goel | A61B 5/1118 | 702/141 |
| 2014/0362480 A1 * | 12/2014 | Veil | H02H 3/26 | 361/18 |
| 2015/0046748 A1 * | 2/2015 | Uchida | G06F 9/45558 | 714/14 |
| 2015/0052390 A1 * | 2/2015 | Dryer | G06F 1/30 | 714/14 |
| 2015/0113338 A1 * | 4/2015 | Maruyama | G06F 11/3037 | 714/48 |
| 2016/0034333 A1 * | 2/2016 | Ozawa | G06F 11/0757 | 713/300 |
| 2016/0202716 A1 * | 7/2016 | De Natale | G01R 33/0082 | 700/295 |
| 2016/0209475 A1 * | 7/2016 | Schweigert | G06F 1/28 | |
| 2017/0010938 A1 * | 1/2017 | Huang | G06F 11/1417 | |
| 2017/0047854 A1 * | 2/2017 | Mao | H02M 3/33546 | |
| 2017/0149325 A1 * | 5/2017 | Lau | H02M 1/32 | |
| 2017/0234923 A1 * | 8/2017 | Douglas | G01R 31/2829 | 324/750.3 |
| 2017/0249200 A1 * | 8/2017 | Mustafi | G06F 11/0709 | |
| 2017/0269678 A1 * | 9/2017 | Matsuo | G06F 1/3287 | |
| 2017/0288428 A1 * | 10/2017 | Ishikawa | H02J 7/0026 | |
| 2017/0358429 A1 * | 12/2017 | Nitschke | H01J 37/32082 | |
| 2018/0026477 A1 * | 1/2018 | Carter | G06F 1/26 | 713/300 |
| 2018/0032391 A1 * | 2/2018 | Furuya | G06F 1/24 | |
| 2018/0120914 A1 * | 5/2018 | Donlin | G06F 1/28 | |
| 2018/0136682 A1 * | 5/2018 | Koh | G05B 11/01 | |
| 2018/0183252 A1 * | 6/2018 | Kim | H01M 10/425 | |
| 2018/0248234 A1 * | 8/2018 | Okabe | H02H 7/18 | |
| 2018/0253131 A1 * | 9/2018 | Heinrich | G06F 1/26 | |
| 2018/0328998 A1 * | 11/2018 | Zhang | G01R 31/367 | |

(56) References Cited

U.S. PATENT DOCUMENTS

2019/0130666 A1* 5/2019 Matsuura ................ G07C 5/08
2019/0250687 A1* 8/2019 Allahut ................ G06F 1/3287

OTHER PUBLICATIONS

NXP; "TEA18363T—GreenChip SMPS control IC—Rev-2"; Product Data sheet; 27 pages (Dec. 12, 2013).

* cited by examiner

POWER CONTROLLER

The present specification relates to systems, methods, apparatuses, devices, articles of manufacture and instructions for power control.

SUMMARY

According to an example embodiment, a power controller for a power device, wherein the power device includes a normal state, the power controller comprising: an input configured to receive fault detection signals attributable to the power device; an output configured to be coupled to the power device; and wherein the power controller is configured to send a state change signal over the output to change the normal state of the power device to a first fault state for a first time period in response to a first fault detection signal; and wherein the power controller is configured to send a state change signal over the output to change the first fault state of the power device to a second fault state for a second time period in response to a second fault detection signal.

In another example embodiment, the power device is a power supply.

In another example embodiment, the first fault state configures the power device to restart; and the second fault state configures the power device to remain off.

In another example embodiment, at least one of the fault states configures the power device to enter a safe-operating-state where output power from the power device is reduced.

In another example embodiment, the power controller is configured to send a state change signal over the output to change the first fault state of the power device to the normal state if the second fault detection signal does not occur within a third time period.

In another example embodiment, the power controller is configured to send the state change signal over the output to change the first fault state of the power device to the second fault state only if the second fault detection signal occurs within a third time period.

In another example embodiment, further comprising a fault counter; wherein the power controller is configured to increment the fault counter in response to the fault detection signals; and wherein the power controller is configured to send a state change signal over the output to change the first fault state of the power device to the normal state if the fault counter is less than a preset count.

In another example embodiment, further comprising a fault counter; wherein the power controller is configured to increment the fault counter in response to the fault detection signals; and wherein the power controller is configured to send a state change signal over the output to change the first fault state of the power device to the second fault state if the fault counter is greater than a preset count.

In another example embodiment, further comprising a fault counter; wherein the power controller is configured to increment the fault counter in response to the fault detection signals; and wherein the power controller is configured to decrement the fault counter if the second fault detection signal has not been received within the first time period.

In another example embodiment, further comprising a set of fault counters; wherein the power controller is configured to increment each fault counter in response to a different fault detection signal.

In another example embodiment, the fault detection signals correspond to at least one of: a high temperature, a shorted output, overvoltage, a transient, component damage, a loss of communications, current too large, or exceeding a maximum time limit.

In another example embodiment, a duration of the first time period and a duration of the second time period is based on selected attributes of the power device.

In another example embodiment, a duration of the first time period and a duration of the second time period is based on selected attributes of the fault detection signal.

In another example embodiment, the power device is a first power device and the fault detection signals attributable to the first power device are internal fault detection signals; further comprising a communications link port configured to receive external fault detection signals attributable to a second power device; wherein the power controller is configured to send state change signals over the communications link port to change states of the second power device in response to the external fault detection signals.

In another example embodiment, the communication link communicates using at least one of: a USB Power Delivery protocol, or a Quick Charge protocol.

In another example embodiment, the power controller is configured to manage power in at least one of: an energy storage device, a power supply, a power adapter, a power conditioning circuit, a power gateway, or a power management hub.

In another example embodiment, the power controller is embedded in at least one of: a TV, a laptop computer, a smartphone, a mobile device, a personal computer, a battery or battery pack, a home power management system, an energy harvesting circuit, a wind driven generator, or a solar cell powered system.

According to an example embodiment, an article of manufacture including at least one non-transitory, tangible machine readable storage medium containing executable machine instructions for power control of a power device, the instructions comprising: initialize power device to a normal state; receive a first fault signal from the power device; place power device in a first fault state for a first time period in response to the first fault signal; receive a second fault signal from the power device; and place power device in a second fault state for a second time period in response to the second fault signal.

According to an example embodiment, a power supply, wherein the power supply includes a normal state, comprising: a power controller; wherein the power controller includes, an input configured to receive fault detection signals attributable to the power supply; and an output configured to be coupled to the power supply; wherein the power controller is configured to send a state change signal over the output to change the normal state of the power supply to a first fault state for a first time period in response to a first fault detection signal; and wherein the power controller is configured to send a state change signal over the output to change the first fault state of the power supply to a second fault state for a second time period in response to a second fault detection signal.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings, in which:

Figure 1:
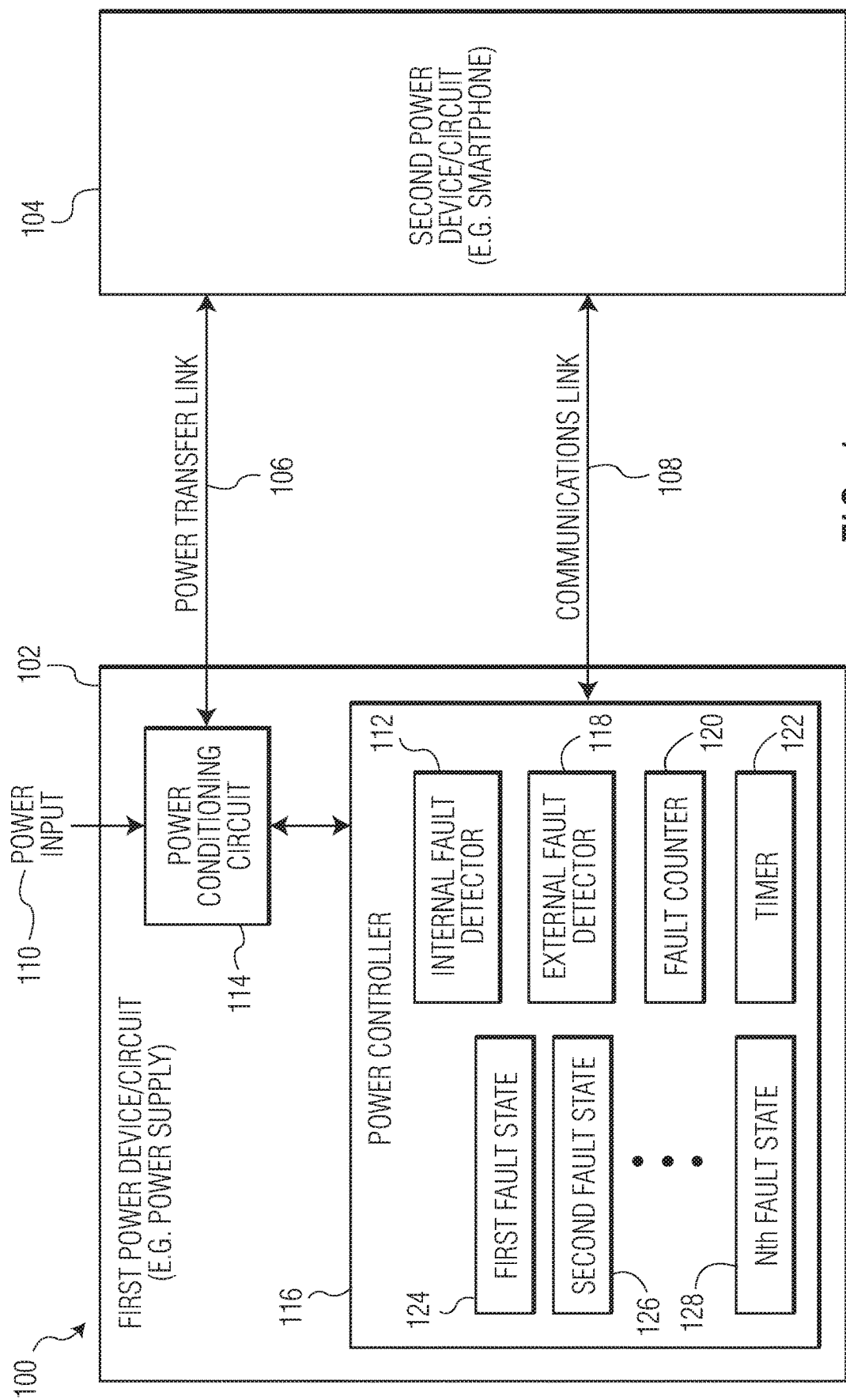
FIG. 1 is an example of a power controller in a power device.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Power devices, such as power supplies, provide power to or manage power between electronic applications, like laptop's, mobile phones, TV's and many more. These power devices can manage a high amount of power and therefore a high level of safety is required.

When a faulty situation like high temperature, shorted output, etc. is detected, some example power devices employ a latched fault response, while other example power devices employ a repeated reboot/restart fault response. Such fault responses can avoid creating further danger to either the electronic application and/or the electronic application's external environment. Both responses have their advantages and disadvantages.

When using a latched fault response, the power device enters a latched mode where it stops operating and remains off until a user disconnects the power device from the mains. When using a repeated reboot/restart fault response, the power device initially stops operating, but reboots/restarts again after a waiting time (e.g. 1 sec). Various IC power controllers would then be designed to either remain shut down or repeatedly reboot/restart.

A disadvantage of using the latched fault response is that if the power controller falsely detects a fault, even if the fault is only transient, the power device will be turned off and remain off. For example, if a power supply for a TV employs latched fault response, the complete TV remains off in response to a fault and a user may conclude that the TV is broken and brings it to the shop for repair. At the shop, the TV operates properly again since it was temporarily disconnected from the mains.

An advantage of the repeated reboot/restart fault response is that after a false fault detection or temporarily faulty situation, the electronic device reboots/restarts and continues operating normally again. However, a disadvantage of the repeated reboot/restart fault response occurs if the faulty situation is permanent, (e.g. a component broke down), the power device will nonetheless continuously reboot/restart which could either further damage the electronic device and/or creates a hazardous external situation (e.g. smoke or fire danger).

Another example approach is to employ either the latched fault response or the repeated reboot/restart fault response depending upon a type of fault detected. So for example if a high temperature condition is detected, then the power device would be latched; however, when a shorted output condition occurs the power device would reboot/restart.

Now discussed is a way to combine various power device fault responses (e.g. latched, reboot/restart, partial-power, etc.) and have the advantages of each individual protection response.

In one example embodiment, for instance, a power device has at least two responses (i.e. latched response and reboot/restart response). The power device first restarts several times to assure that it is a faulty situation and not a false/transient trigger. If not, then second the power device goes into a latched response. This example avoids the problem of false triggering, but is still safe if the fault is real and permanent.

FIG. 1 is an example 100 of a power controller 116 in a power device 102. The power device 102 (e.g. power supply) is coupled to a second power device/circuit 104 by a power transfer link 106 and a communications link 108. The power device 102 includes a power input 110, power conditioning circuit 114 (e.g. for voltage regulation and switching), and the power controller 116. The power controller 116 includes an internal fault detector 112, an external fault detector 118, a fault counter 120, a timer 122, and a set of configuration states 124, 126, 128.

The power controller 116 initially sets the first power device 102 to a normal state (e.g. device is "on" and is running normally). The power controller 116 is configured to receive fault detection signals from the internal fault detector 112 attributable to the first power device 102.

The power controller 116 is configured to send a state change signal to the power conditioning circuit 114 to change the normal state of the first power device 102 to a first fault state 124 for a first time period in response to a first fault detection signal from the internal fault detector 112.

The power controller 116 is also configured to send a state change signal to the power conditioning circuit 114 to change the first fault state 124 of the first power device 102 to a second fault state 126 for a second time period in response to a second fault detection signal received from the internal fault detector 112. Note that "first" and "second" fault detections are labels and are do not necessarily a specific time sequence (i.e. additional faults can be detected before, between or after the "first" and "second" faults).

The timer 122 is used to keep track of the first and second time periods. These time periods allow for transient faults or repaired/bypassed/etc. faults to occur without unduly disrupting the power device 102.

In some example embodiments, the first fault state 124 configures the first power device 102 to restart, and the second fault state 126 configures the first power device 102 to remain off (i.e. an off state). In the off state the power device/circuit 102 is off. Other fault states can configure the first power device 102 to enter other states, such as a safe operating state. In the safe operating state the power device/circuit 102 output power is minimized. For example, assume that a mobile phone is being fast charged using a high current, upon fault detection the power device/circuit 102 reduces the output power, but at least the mobile phone is charging even though it takes more time. If fault condition remains, the power controller 116 forces the power device/circuit 102 into an off state, and mobile phone charging stops.

In some example embodiments, the power controller 116 is configured to send a state change signal over the output to change the first fault state 124 of the first power device 102 to the normal state if the second fault detection signal does not occur within the first time period. This addresses transient faults.

Similarly, the power controller 116 can be configured to send the state change signal over the output to change the first fault state 124 of the first power device 102 to the second fault state 126 only if the second fault detection signal occurs within the first time period. This addresses permanent faults, and the power device 102 can be placed in a latched protection state.

In those example embodiments including a fault counter 120, the power controller 116 is configured to increment the fault counter 120 in response to the fault detection signals.

The power controller 116 is then configured to send a state change signal over the output to change the first fault state 124 of the first power device 102 to the normal state if the fault counter 120 is less than a preset count.

Alternatively, the power controller 116 is configured to send a state change signal over the output to change the first fault state 124 of the first power device 102 to the second fault state 126 if the fault counter 120 is greater than a preset count.

The power controller 116 can also be configured to decrement (e.g. including resetting to zero) the fault counter 120 if the second fault detection signal has not been received within the first time period. This is an example where the power device 102 is operating for a specified period of time without any fault detected, and the fault counter 120 is reset to zero since the fault condition is no longer present.

Certain example embodiments include a set of fault counters 120 and the power controller 116 is configured to increment each fault counter 120 in response to a different fault detection signal. Multiple counts can filter fault conditions that are permanent from those that are transient should multiple fault types occur. In other examples all the faults are totalled by the counter 120.

The fault detection signals correspond to at least one of: a high temperature, a shorted output, overvoltage, a transient, component damage, a loss of communications, current too large, or exceeding a maximum time limit.

The duration of the first and second time periods can be based on selected attributes of the first power device 102 (i.e. is the power device 102 a power adaptor, a smartphone, etc.). The duration of the first and second time periods can also be based on selected attributes of the fault detection signal (i.e. varies with the type of fault).

Thus in various example embodiments, the power controller 116 is configured to vary a duration and/or pattern of first state (e.g. reboot) and second state (e.g. latching) periods and sequences based on either or both a type of device and/or a fault detected.

For example, the power device 102 can be rebooted for a first time period, and then latched for a second time period if the reboots did not erase the fault detected.

Some example embodiments include a communications link 108 between the first and second devices 102, 104. In these embodiments, the power controller 116 is configured to receive external fault detection signals attributable to the second power device 104. The power controller 116 can then be configured to send state change signals over the communications link 108 port to change states of the second power device 104 in response to the external fault detection signals. The communication link 108 can carry signals corresponding to at least one of: a USB Power Delivery protocol, or a Quick Charge protocol.

In those example embodiments where the power controller 116 is configured to vary a duration and/or pattern of first state (e.g. reboot) and second state (e.g. latching) periods, latching and rebooting can be augmented by or replaced with other power device 102 configuration states including: limiting an output voltage and/or current between the first power device 102 and the second power device 104.

In some example embodiment, if the second device 104 (e.g. smartphone) requests a higher output voltage and current, initially the power controller 116 will increase voltage and current sent to the device/circuit 104. If then a fault is detected, the power controller 116 resets the output voltage and current to an initial value. If the fault continues to be detected for several times, the power controller 116 does not increase the voltage and current anymore but signals the power conditioning circuit 114 to keep the output voltage and current at a default value even if the second power device 104 requests a higher voltage and current.

An example list of devices which the power controller 116 can be configured to manage includes: an energy storage device, a power supply, a power adapter, a power conditioning circuit, a power gateway, or a power management hub.

In various embodiments, the power controller 116 can be embedded in at least one of: a TV, a laptop computer, a smartphone, a mobile device, a personal computer, a battery or battery pack, a home power management system, an energy harvesting circuit, a wind driven generator, or a solar cell powered system.

Figure 2A:
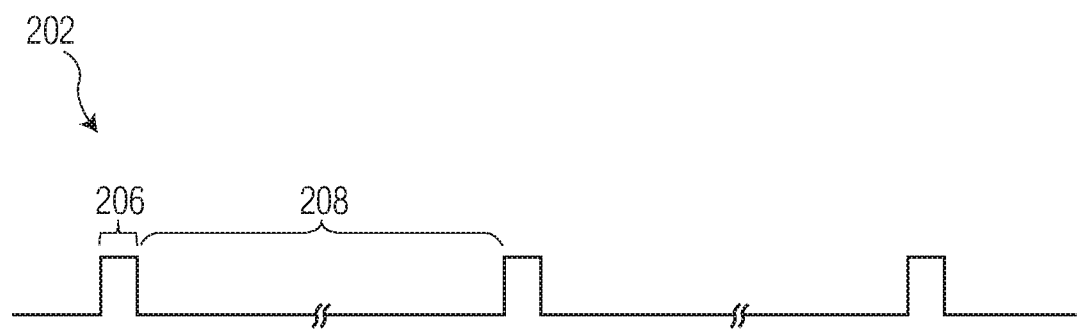
FIGS. 2A and 2B show example fault states and time periods activated by the power controller.
Figure 2B:
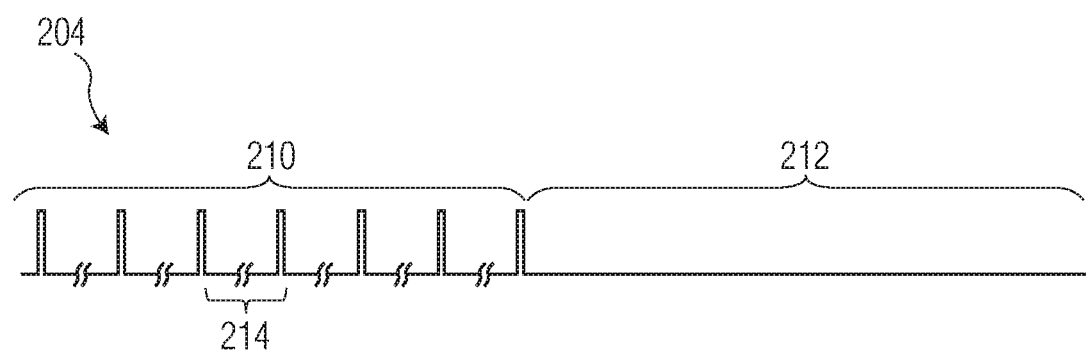

FIGS. 2A and 2B are example fault states and time periods activated by the power controller 116. FIG. 2A shows a first example 202 set of fault states and time periods for either the first or second power devices 102, 104. A first fault state having a first time period 206 and a second fault state having a second time period 208 are shown.

While each of these fault states and time periods may vary depending upon a use case, in one example embodiment this first example 202 corresponds to a smartphone having a damaged battery fault. Here the smartphone is placed in the first fault state having a first time period 206 so that a power adaptor can attempt to charge the potentially damaged battery. Then in the second fault state having a second time period 208 charging stops and attempts to reboot the smartphone and clear the damaged battery fault are made. As shown, the first and second time periods 206, 208 are in this example unequal. Additionally, how the power controller 116 is set up can be varied to control operational times and behavior of the power device 102 (i.e. power supply).

FIG. 2B shows a second example 204 set of fault states and time periods for either the first or second power devices 102, 104. A third fault state having a third time period 210 and a fourth fault state having a fourth time period 212 are shown. The third fault state 210 also includes a sub-state having a fifth time period 214.

In this example embodiment the second example 204 corresponds to the smartphone having the same damaged battery fault as in FIG. 2A; however here the power adaptor is instead placed in the third fault state having a third time period 210 so that the power adaptor can attempt to restart the smartphone and potentially clear the damaged battery fault. The sub-state having a fifth time period 214 defines the restart interval. Then if the battery fault is not cleared, the power adaptor is placed in the fourth fault state having a fourth time period 212, which is a latched mode during which no restarts are attempted.

Figure 3:
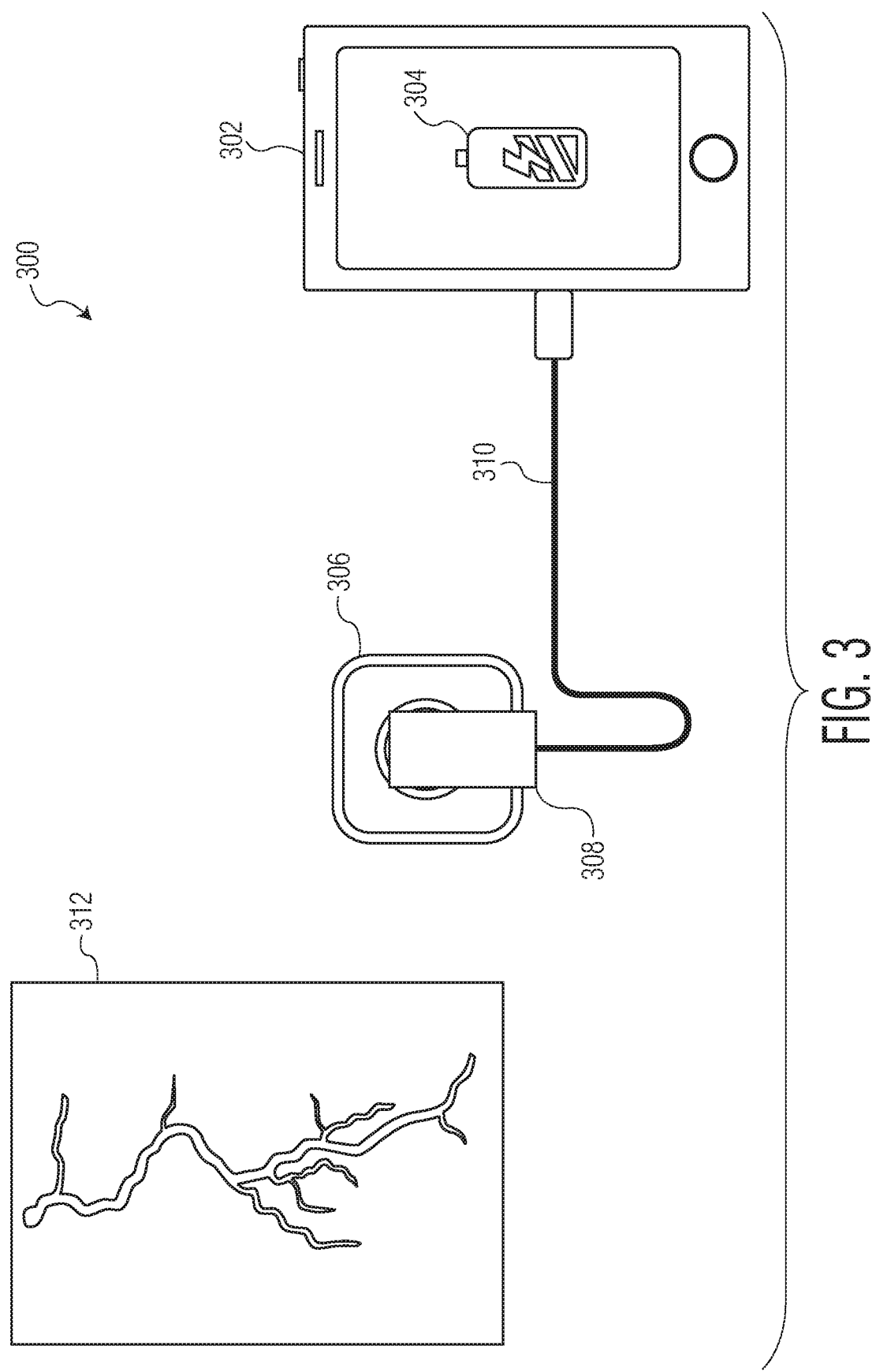
FIG. 3 is a first example fault in a system including the power controller.

FIG. 3 is a first example 300 fault in a system including the power controller 116. Included in this first example 300 is a mobile device 302 (e.g. a smartphone) having an internal storage device 304 (e.g. battery), a power adaptor 308 connected to a mains power 306. The mobile device 302 and power adaptor 308 are connected by a cable 310. The power controller 116 can be within the power adaptor 308 and/or the mobile device 302.

In this example, a transient fault 312 (e.g. lightning strike) occurs. Due to the lightning strike, the mains voltage increases to a few thousands of voltage, instead of the regular 110 VAC or 230 VAC and the power controller 116 commands the power adapter 308 to enter a protection state (i.e. a first fault state 124). If this protection state is a latched state, the mobile device 302 will not be charged even though the lightning strike has ended and it would be safe to charge the mobile device 302 again.

Figure 4:
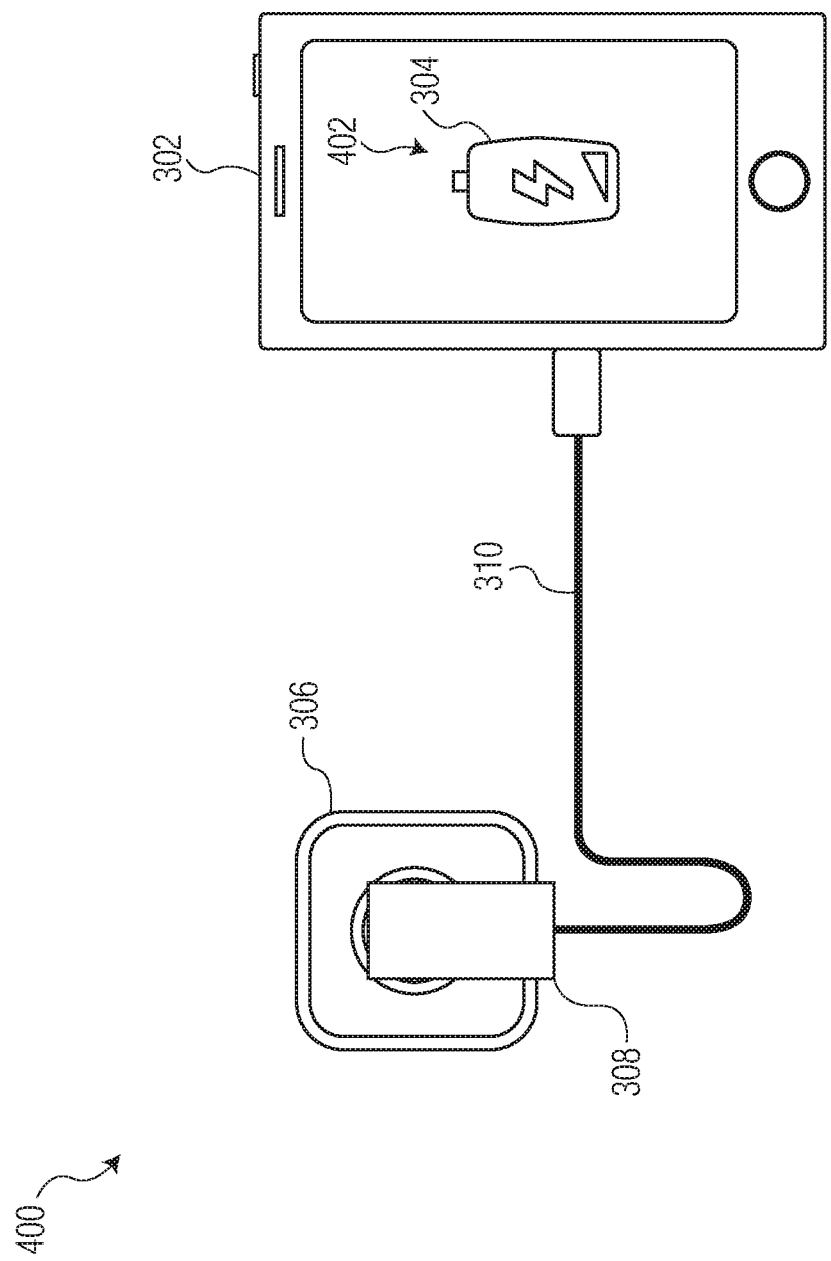
FIG. 4 is a second example fault of the system including the power controller.

FIG. 4 is a second example 400 fault of the system including the power controller 116. In this example a permanent fault 402 (e.g. damaged storage device/battery) occurs. Although the battery 304 is damaged, the power adaptor 308 may still be programmed by the power controller 116 to keep charging the battery 304 but only over a specific time interval.

However, if the power controller 116 combines both first and second fault states, the first fault state 124 could be a safe restart which would better cover the example 300 in FIG. 3 where the lightning strike occurs and instead the smart phone 302 battery 304 would be charged again after the safe restart time.

If at each restart, however, fault detection signals continue to be received, then the power controller 116 commands the power adapter 308 to enter a latched protection state (i.e. a second fault state 126). In this way any overload situation of the battery 304 is prevented.

To summarize, the power controller 116 in various example embodiments can be used in a variety of applications that require power management such as an energy storage device, a power supply, a power adapter, a power conditioning circuit, a power gateway, a power management hub, and so on.

The power controller 116 can be embedded in a TV, a laptop computer, a smartphone, a mobile device, a personal computer, a battery or battery pack, a home power management system, an energy harvesting circuit, a wind driven generator, a solar cell system, etc.

Figure 5:
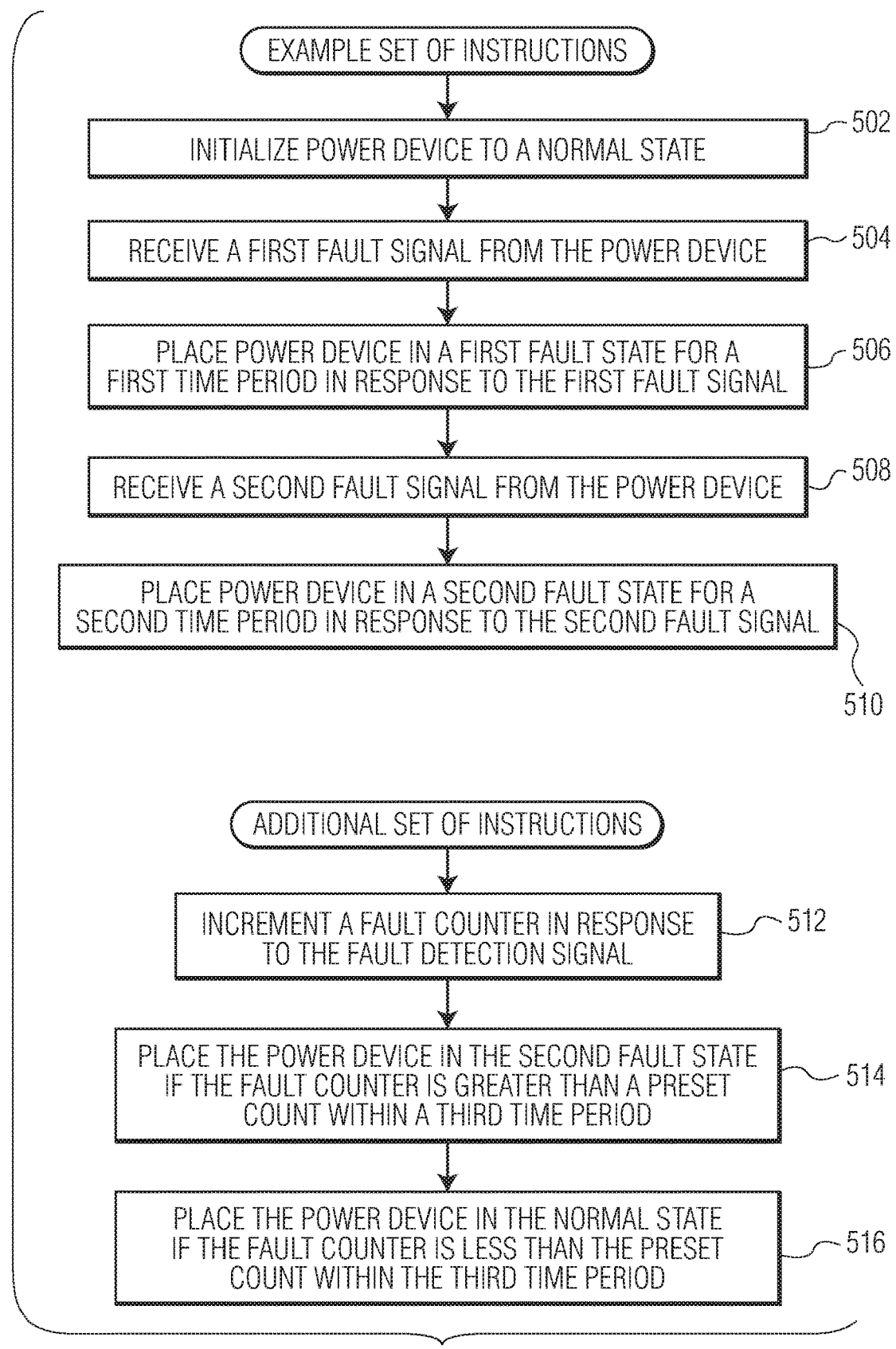
FIG. 5 is an example set of instructions for enabling the power controller.

FIG. 5 is an example set of instructions 500 for enabling the power controller 116. The order in which the instructions are discussed does not limit the order in which other example embodiments implement the instructions unless otherwise specifically stated. Additionally, in some embodiments the instructions are implemented concurrently.

A first example instruction set begins in 502, initialize power device to a normal state. Next in 504, receive a first fault signal from the power device. Then in 506, place power device in a first fault state for a first time period in response to the first fault signal. In 508, receive a second fault signal from the power device. Then in 510, place power device in a second fault state for a second time period in response to the second fault signal.

The instructions can be augmented or replaced with one or more of the following additional instructions: 512—increment a fault counter in response to the fault detection signal; 514—place the power device in the second fault state if the fault counter is greater than a preset count within a third time period; and 516—place the power device in the normal state if the fault counter is less than the preset count within the third time period.

Figure 6:
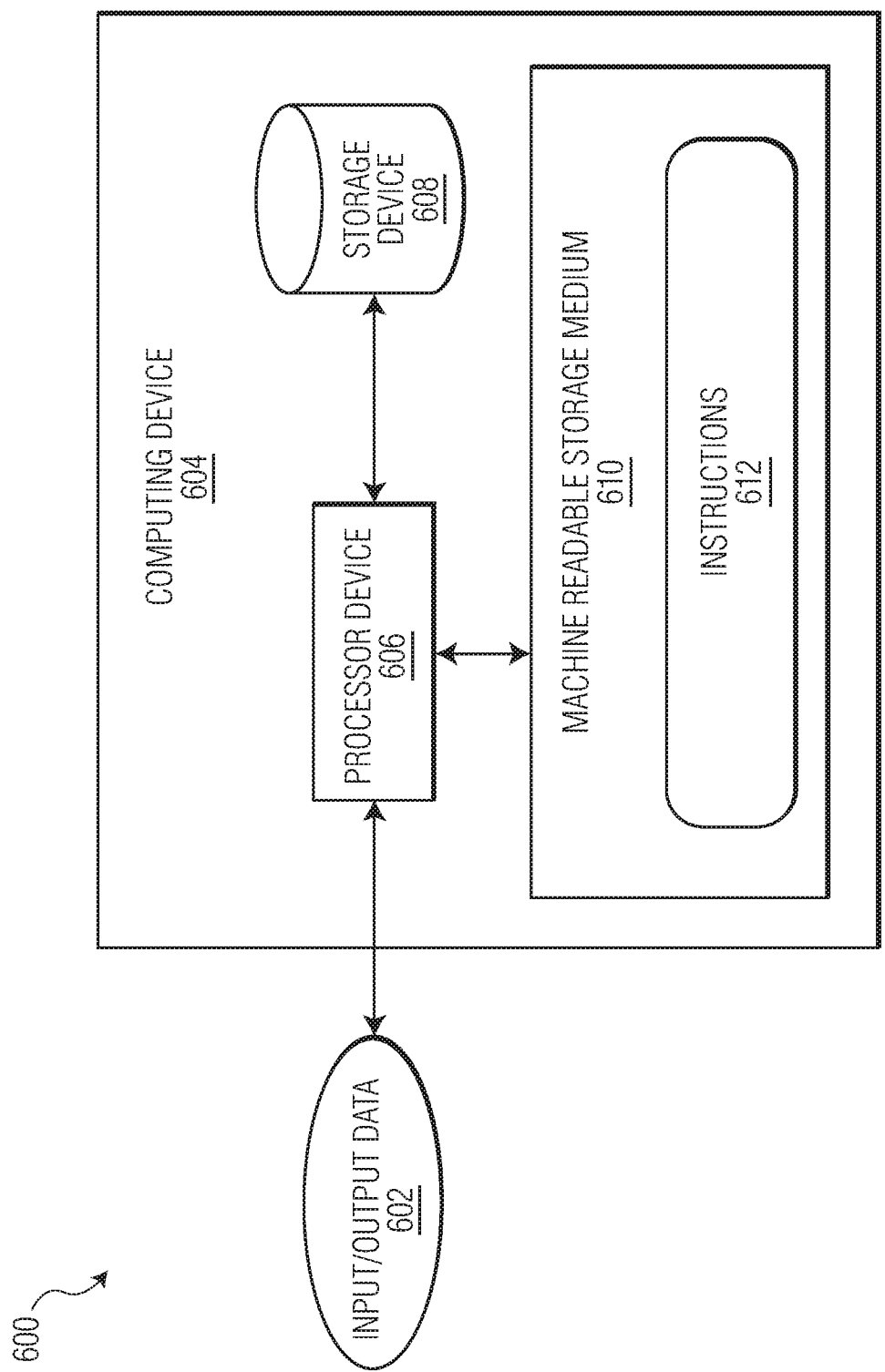
FIG. 6 is an example system for hosting the instructions for enabling the power controller.

FIG. 6 is example system 600 for hosting instructions for enabling the power controller 116. The system 600 shows an input/output data 602 interface with an electronic apparatus 604. The electronic apparatus 604 includes a processor 606, a storage device 608, and a non-transient machine-readable storage medium 610. The machine-readable storage medium 610 includes instructions 612 which control how the processor 606 receives input data 602 and transforms the input data into output data 602, using data within the storage device 608. Example instructions 612 stored in the machine-readable storage medium 610 are discussed elsewhere in this specification. The machine-readable storage medium in an alternate example embodiment is a non-transient computer-readable storage medium.

The processor (such as a central processing unit, CPU, microprocessor, application-specific integrated circuit (ASIC), etc.) controls the overall operation of the storage device (such as random access memory (RAM) for temporary data storage, read only memory (ROM) for permanent data storage, firmware, flash memory, external and internal hard-disk drives, and the like). The processor device communicates with the storage device and non-transient machine-readable storage medium using a bus and performs operations and tasks that implement one or more instructions stored in the machine-readable storage medium. The machine-readable storage medium in an alternate example embodiment is a computer-readable storage medium.

In some example embodiments the set of instructions described above are implemented as functional and software instructions. In other embodiments, the instructions can be implemented either using logic gates, application specific chips, firmware, as well as other hardware forms.

In this specification, example embodiments have been presented in terms of a selected set of details. However, a person of ordinary skill in the art would understand that many other example embodiments may be practiced which include a different selected set of these details. It is intended that the following claims cover all possible example embodiments.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A power controller for a power device, wherein the power device includes a normal state, the power controller comprising:
   an input configured to receive fault detection signals attributable to the power device;
   an output configured to be coupled to the power device;
   wherein the power controller is configured to send a state change signal over the output to change the normal state of the power device to a first fault state for a first time period in response to a first fault detection signal;
   wherein the power controller is configured to send a state change signal over the output to change the first fault state of the power device to a second fault state for a second time period in response to a second fault detection signal;
   wherein the second fault state configures the power device to enter a safe-operating-state where output power from the power device is reduced to a power level that is less than in the normal state but greater than in an off or disabled state;
   wherein the power device is not disabled or deactivated in response to the fault detection signals;
   wherein the first fault state is a transient fault state; and
   wherein the second fault state is a permanent fault state.

2. The power controller of claim 1:
   wherein the power device is a power supply.

3. The power controller of claim 1:
   wherein the first fault state configures the power device to restart; and
   wherein the second fault state configures the power device to remain off.

4. The power controller of claim 1:
   wherein the power controller is configured to send a state change signal over the output to change the first fault state of the power device to the normal state if the second fault detection signal does not occur within a third time period.

5. The power controller of claim 1:
   wherein the power controller is configured to send the state change signal over the output to change the first fault state of the power device to the second fault state only if the second fault detection signal occurs within a third time period.

6. The power controller of claim 1:
   further comprising a fault counter;
   wherein the power controller is configured to increment the fault counter in response to the fault detection signals; and
   wherein the power controller is configured to send a state change signal over the output to change the first fault state of the power device to the normal state if the fault counter is less than a preset count.

7. The power controller of claim 1:
   further comprising a fault counter;
   wherein the power controller is configured to increment the fault counter in response to the fault detection signals; and
   wherein the power controller is configured to send a state change signal over the output to change the first fault state of the power device to the second fault state if the fault counter is greater than a preset count.

8. The power controller of claim 1:
   further comprising a fault counter;
   wherein the power controller is configured to increment the fault counter in response to the fault detection signals; and
   wherein the power controller is configured to decrement the fault counter if the second fault detection signal has not been received within the first time period.

9. The power controller of claim 1:
   further comprising a set of fault counters;
   wherein the power controller is configured to increment each fault counter in response to a different fault detection signal.

10. The power controller of claim 1:
    wherein the fault detection signals correspond to a set of faults that exceed a safe operating range of the power device.

11. The power controller of claim 1:
    wherein a duration of the first time period and a duration of the second time period is based on selected attributes of the power device.

12. The power controller of claim 1:
    wherein a duration of the first time period and a duration of the second time period is based on selected attributes of the fault detection signal.

13. The power controller of claim 1:
    wherein the power device is a first power device and the fault detection signals attributable to the first power device are internal fault detection signals;
    further comprising a communications link port configured to receive external fault detection signals attributable to a second power device;
    wherein the power controller is configured to send state change signals over the communications link port to change states of the second power device in response to the external fault detection signals.

14. The power controller of claim 13:
    wherein the communication link port communicates using at least one of: a USB Power Delivery protocol, or a Quick Charge protocol.

15. The power controller of claim 1:
    wherein the power controller is configured to manage power in at least one of: an energy storage device, a power supply, a power adapter, a power conditioning circuit, a power gateway, or a power management hub.

16. The power controller of claim 1:
    wherein the power controller is embedded in at least one of: a TV, a laptop computer, a smartphone, a mobile device, a personal computer, a battery or battery pack, a home power management system, an energy harvesting circuit, a wind driven generator, or a solar cell powered system.

17. The power controller of claim 1:
wherein the power device is configured to continuously supply output power as the first fault state of the power device transitions to the second fault state.

18. The power controller of claim 1:
wherein the power controller is configured to continue to send power to the power device even in response to a continuous stream of fault detection signals.

19. The power controller of claim 18:
wherein the power device is a battery; and
wherein the fault detection signal is a damaged battery fault signal.

20. A power controller for a power device, wherein the power device includes a normal state, the power controller comprising:
an input configured to receive fault detection signals attributable to the power device;
an output configured to be coupled to the power device;
wherein the power controller is configured to send a state change signal over the output to change the normal state of the power device to a first fault state for a first time period in response to a first fault detection signal;
wherein the power controller is configured to send a state change signal over the output to change the first fault state of the power device to a second fault state for a second time period in response to a second fault detection signal;
wherein the second fault state configures the power device to enter a safe-operating-state where output power from the power device is reduced to a power level that is less than in the normal state but greater than in an off or disabled state; and
wherein the power controller is configured to,
initially increase voltage and/or current sent to the power device in response to a request from the power device to increase the voltage and/or current;
reduce the voltage and/or current sent to the power device in response to the fault detection signal caused in response to the increase of the voltage and/or current; and
ignore subsequent requests from the power device to increase the voltage and/or current in response to the fault detection signal.

* * * * *